Figure 36:
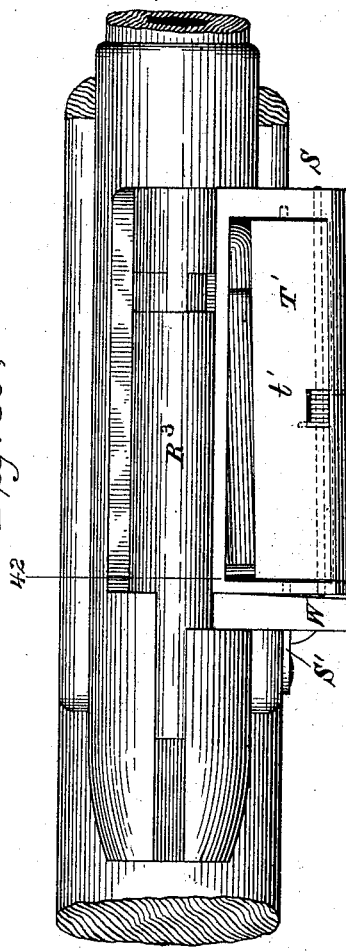

(No Model.)  
10 Sheets—Sheet 1.
A. H. RUSSELL.
Magazine Fire Arm.
No. 230,823.  Patented Aug. 3, 1880.
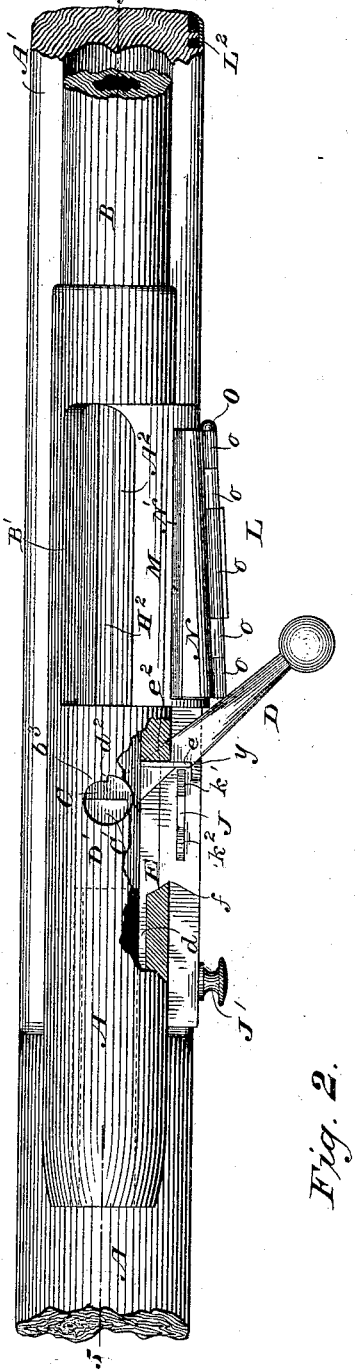
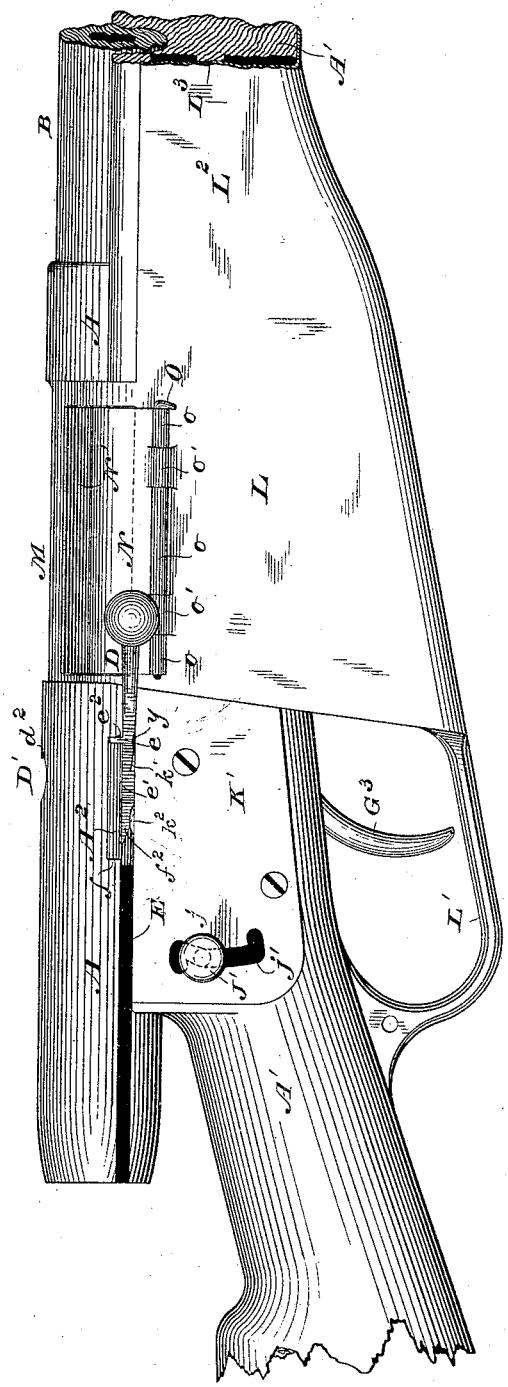
WITNESSES  
Wm A. Skinkle.  
Geo. W. Breck.
INVENTOR  
Andrew H. Russell.  
By his Attorneys  
Baldwin, Hopkins & Peyton.

(No Model.)  
A. H. RUSSELL.  
Magazine Fire Arm.  
No. 230,823. Patented Aug. 3, 1880.  
10 Sheets—Sheet 2.
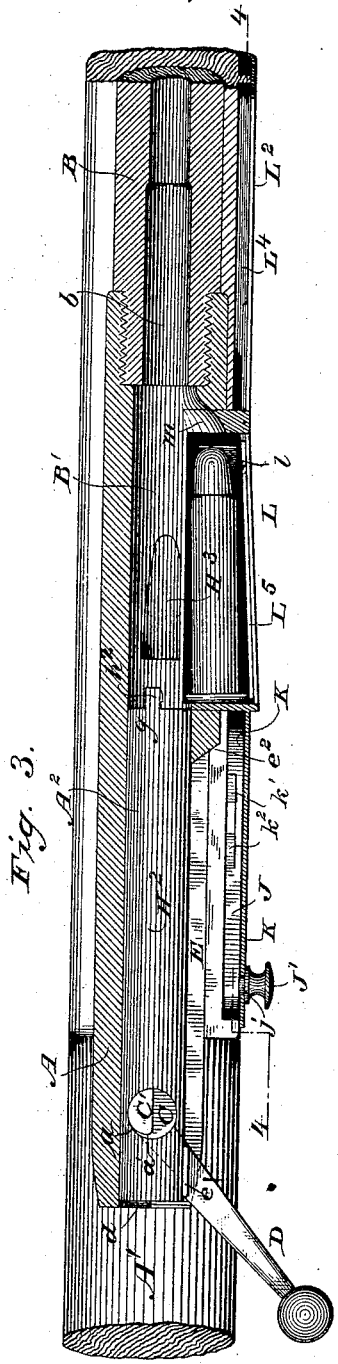
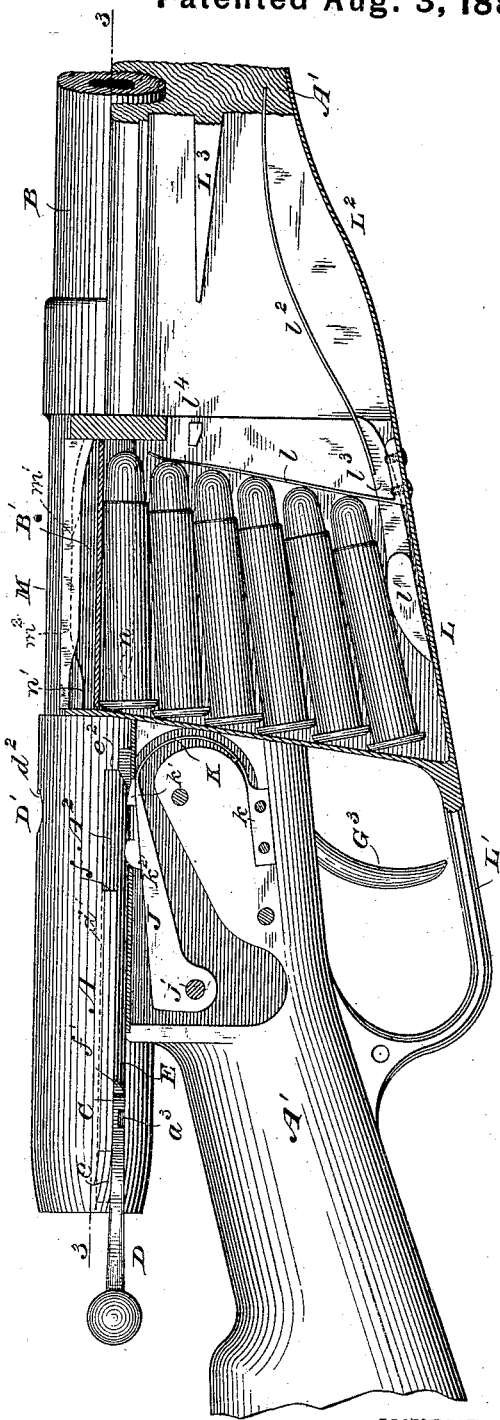
WITNESSES  
Wm A. Skinkle  
Geo W. Buck
INVENTOR  
Andrew H. Russell.  
By his Attorneys  
Baldwin, Hopkins & Peyton (No Model.) 10 Sheets—Sheet 3.
A. H. RUSSELL.
Magazine Fire Arm.
No. 230,823. Patented Aug. 3, 1880.
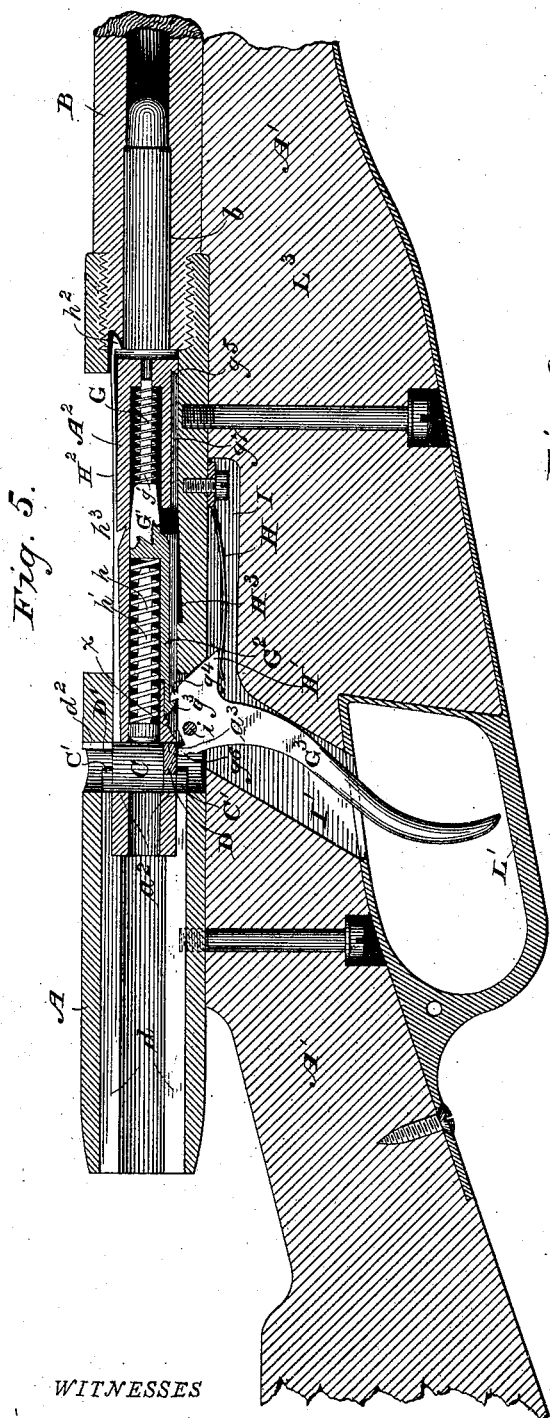
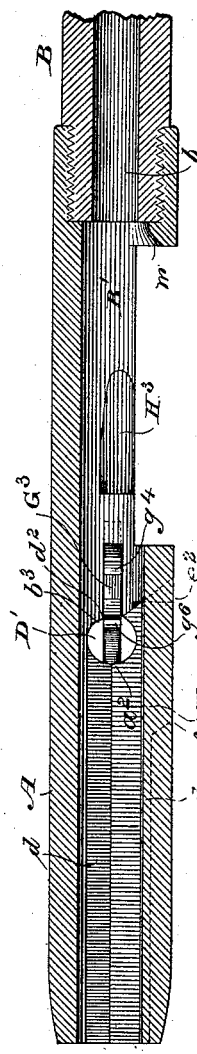
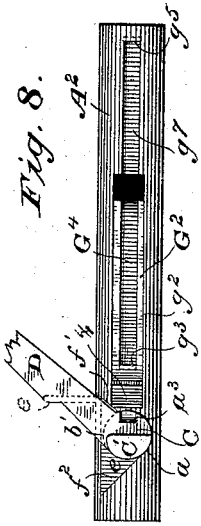
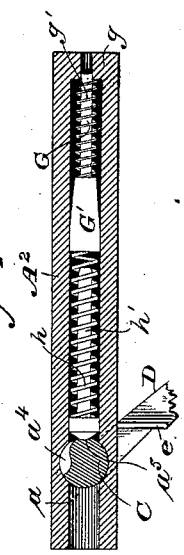
WITNESSES
INVENTOR
Andrew H. Russell.
By his Attorneys (No Model.) 10 Sheets—Sheet 4.
A. H. RUSSELL.
Magazine Fire Arm.
No. 230,823. Patented Aug. 3, 1880.
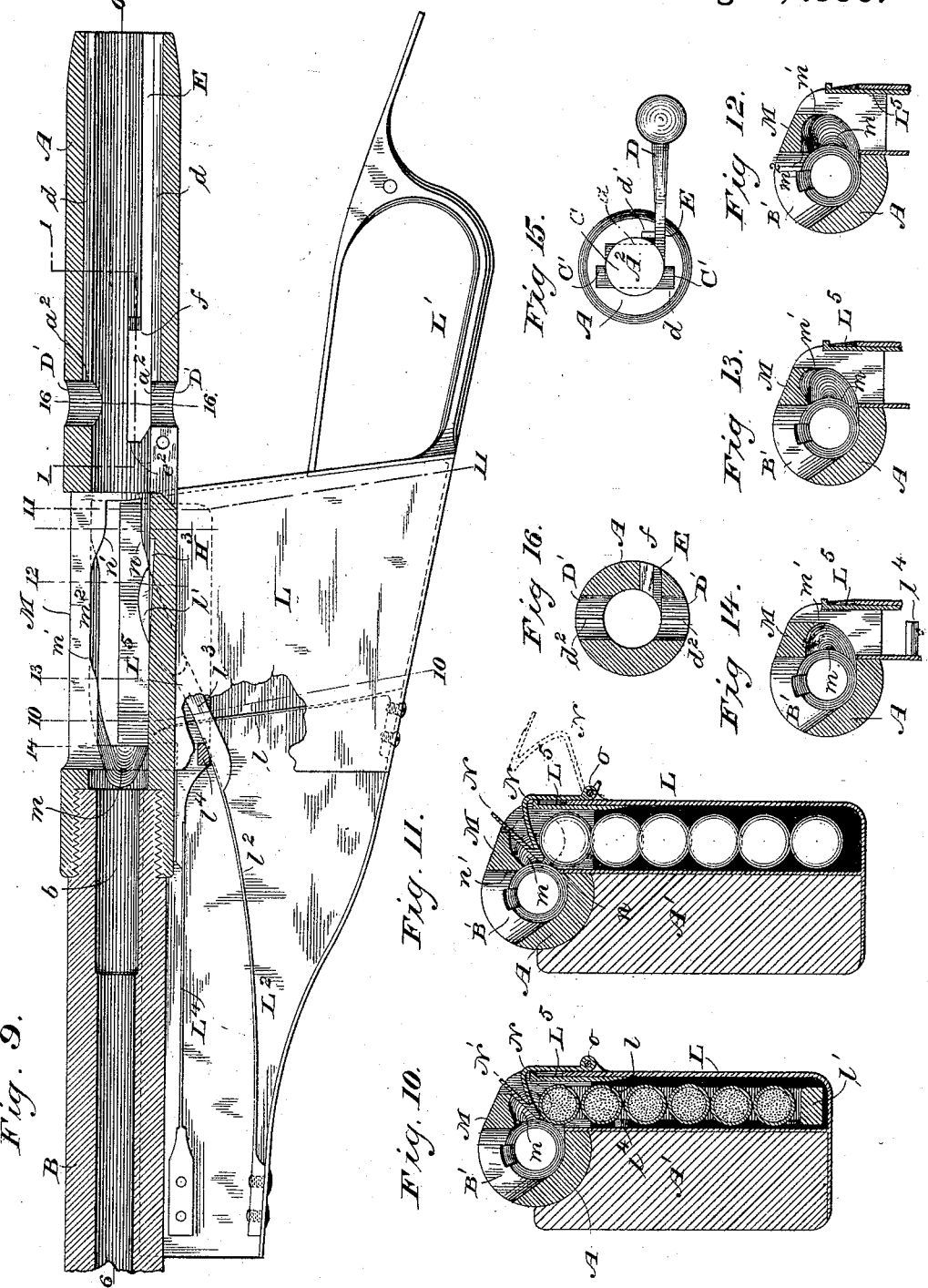
WITNESSES
Wm A. Skinkle
Geo. W. Buck
INVENTOR
Andrew H. Russell
By his Attorneys
Baldwin, Hopkins & Peyton
THE NORRIS PETERS CO., PHOTO-LITHO., WASHINGTON, D. C.

(No Model.)  
A. H. RUSSELL.  
Magazine Fire Arm.  
No. 230,823.  
10 Sheets—Sheet 5.  
Patented Aug. 3, 1880.
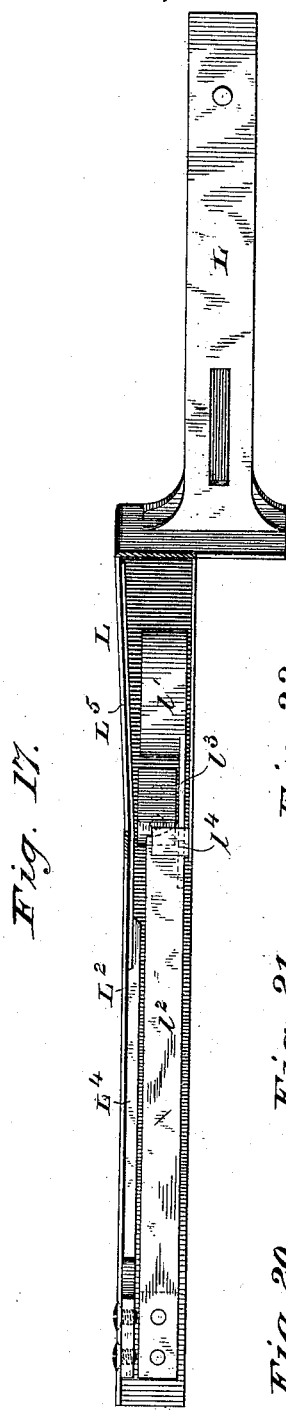
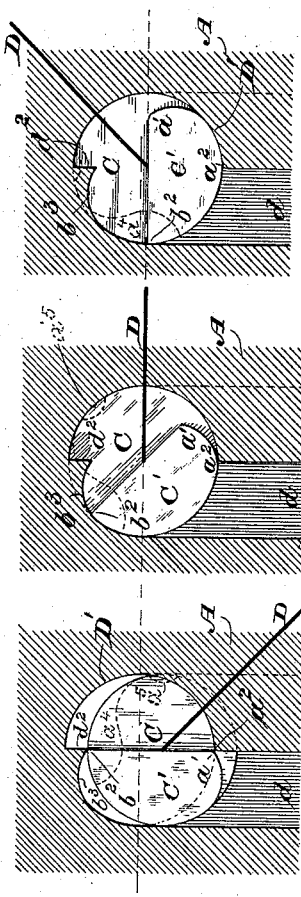
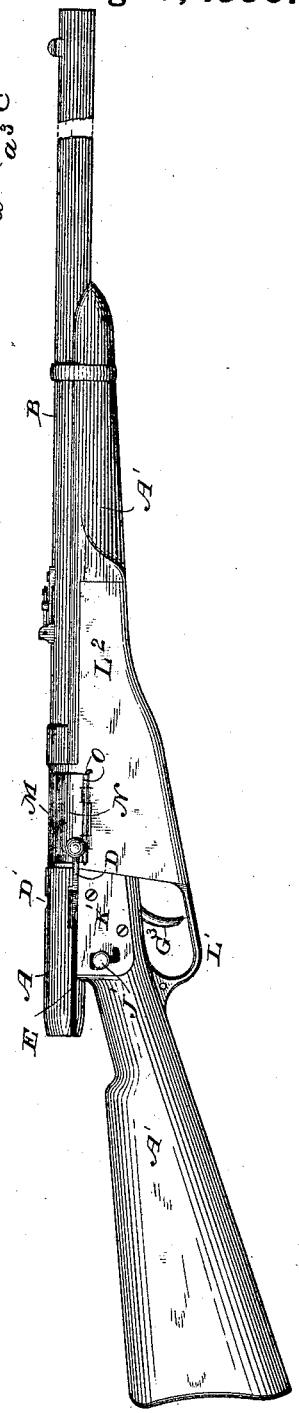
WITNESSES  
Wm A. Skinkle  
Geo W. Breck
INVENTOR  
Andrew H Russell,  
By his Attorneys  
Baldwin, Hopkins & Peyton

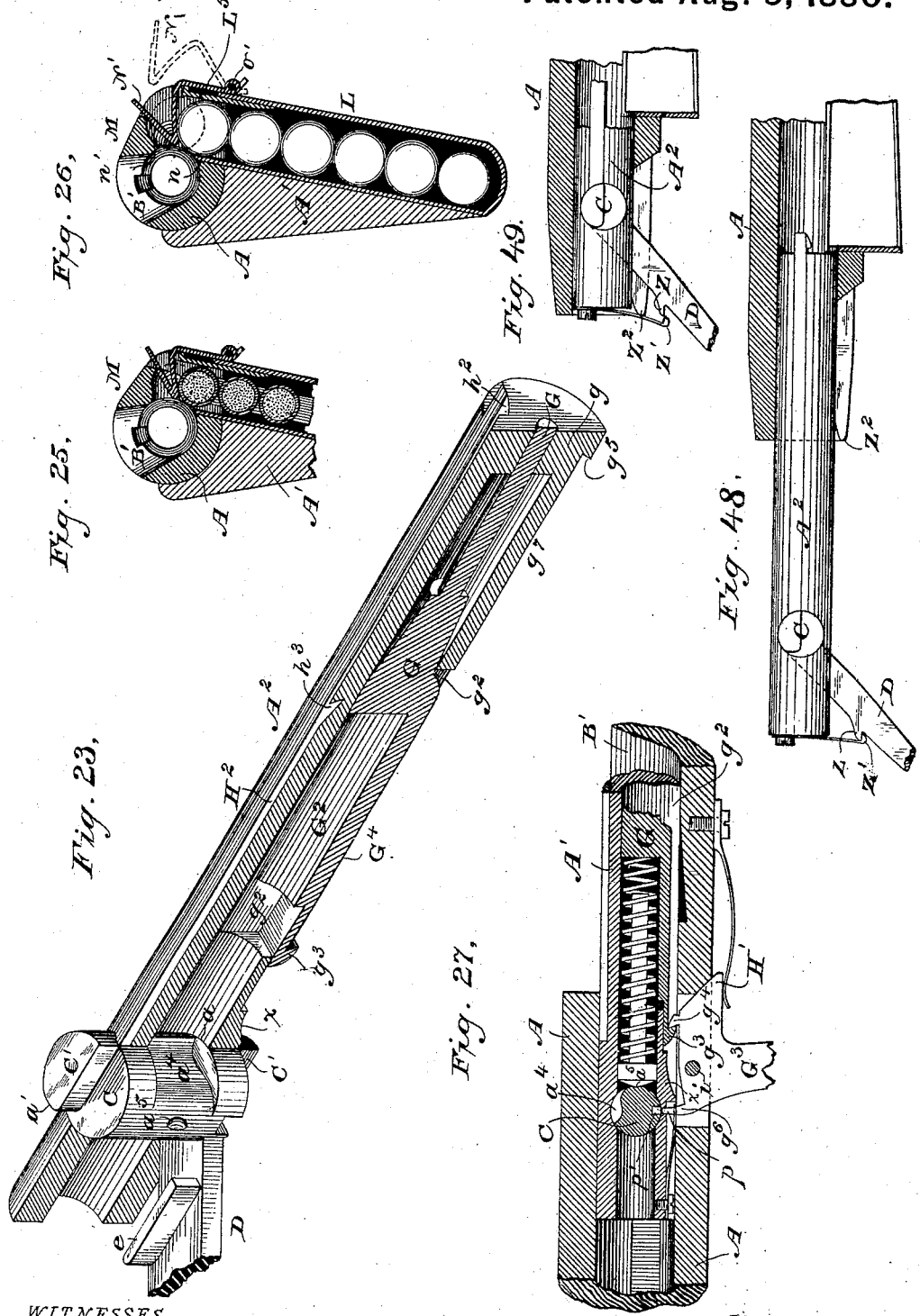

(No Model.) 10 Sheets—Sheet 7.
A. H. RUSSELL.
Magazine Fire Arm.
No. 230,823. Patented Aug. 3, 1880.
*Fig. 28.*
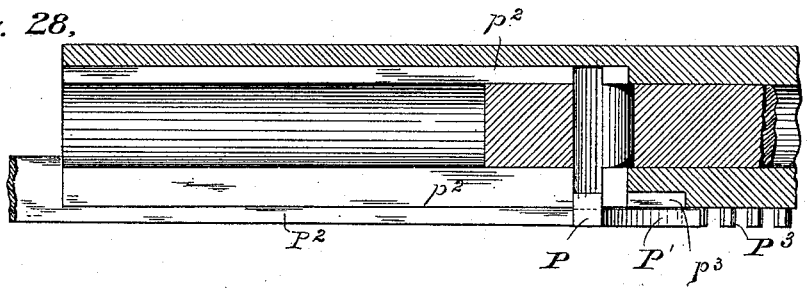
*Fig. 29.*
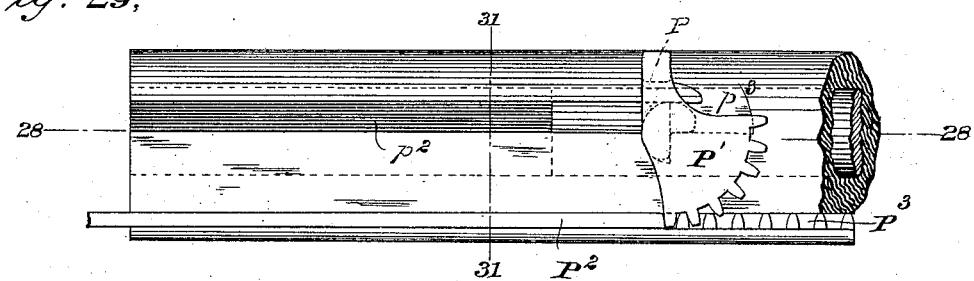
*Fig. 31.*      *Fig. 30.*
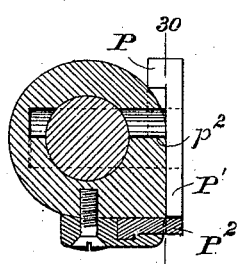 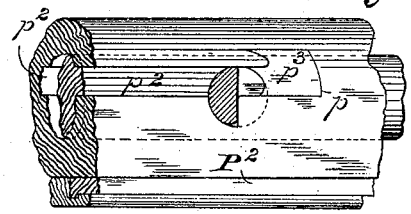
*Fig. 32.*      *Fig. 33.*
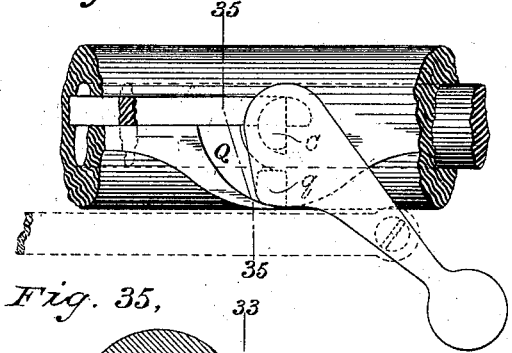 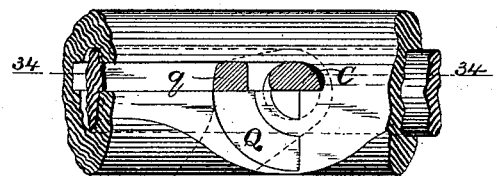
*Fig. 35.*      *Fig. 34.*
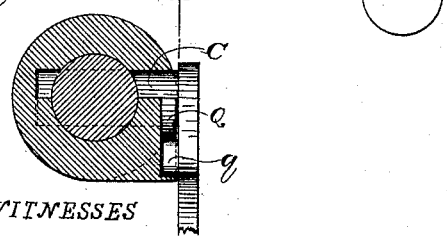
WITNESSES      INVENTOR
Wm A. Skinkle,      Andrew H. Russell,
Geo. W. Breck.      By his Attorneys
     Baldwin, Hopkins & Peyton.

(No Model.) 10 Sheets—Sheet 8.

A. H. RUSSELL.
Magazine Fire Arm.

No. 230,823. Patented Aug. 3, 1880.

WITNESSES
Wm A. Steinkle
Geo. W. Buck

INVENTOR
Andrew H. Russell,
By his Attorneys
Baldwin, Hopkins & Peyton.

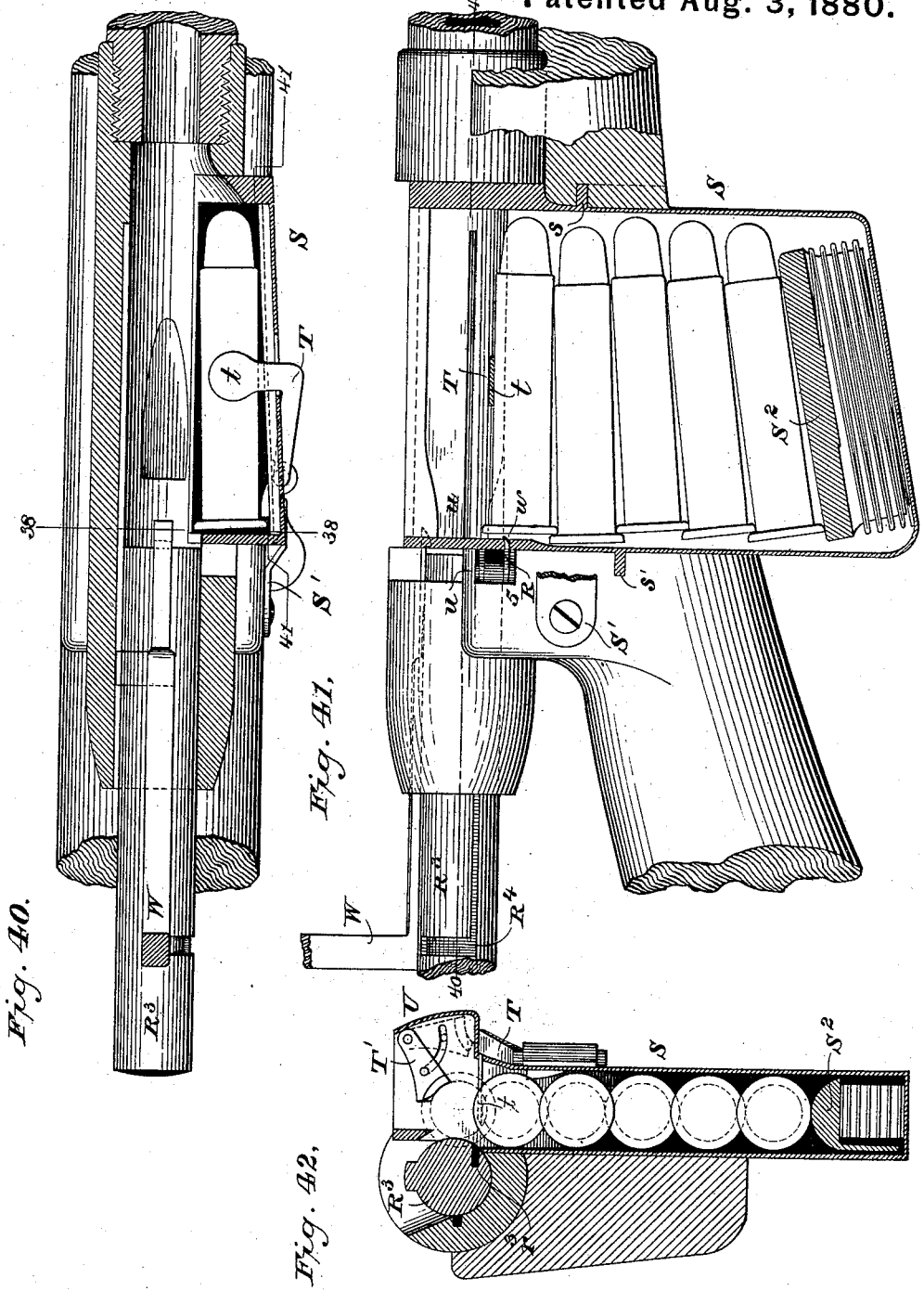

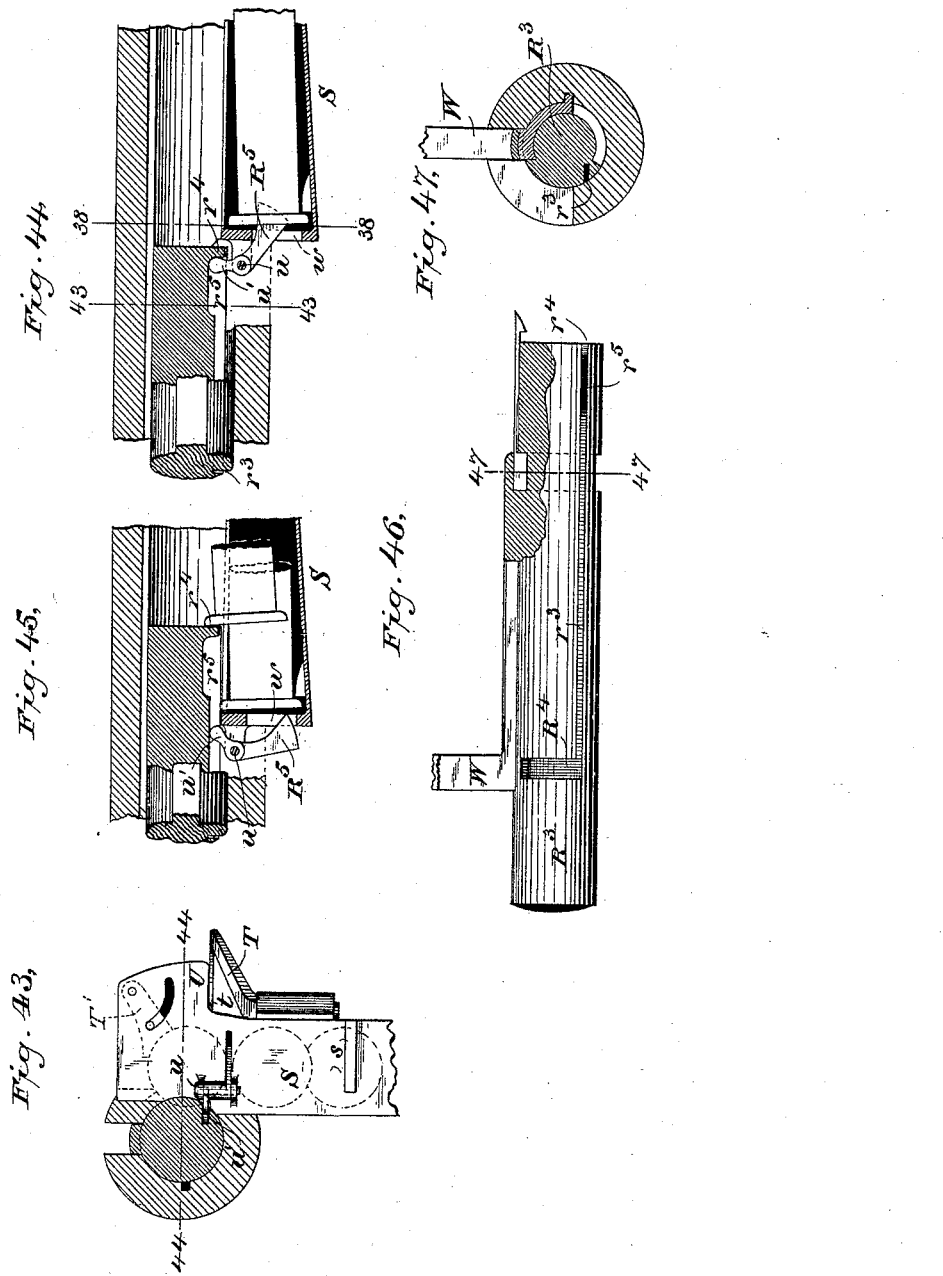

UNITED STATES PATENT OFFICE.

ANDREW H. RUSSELL, OF THE ORDNANCE CORPS, UNITED STATES ARMY, NOW RESIDING AT WATERTOWN, MASSACHUSETTS.

MAGAZINE FIRE-ARM.

SPECIFICATION forming part of Letters Patent No. 230,823, dated August 3, 1880.

Application filed June 9, 1880. (No model.)

*To all whom it may concern:*

Be it known that I, ANDREW H. RUSSELL, of the Ordnance Corps, United States Army, now residing at Watertown, Middlesex county, Massachusetts, have invented certain new and useful Improvements in Breech-Loading Guns, of which the following is a specification.

My invention relates to sundry improvements in breech-loading guns, and mainly to that class of breech-loading small arms which are usually designated "bolt-guns" and have magazines which may be caused to supply cartridges for firing a number of rounds in rapid succession, when desirable to do so, or be thrown out of operation to admit of firing by singly-inserted cartridges or by hand-loading.

Some of the essential features of my improvements may be used without others, and in part my invention may be employed beneficially with machine-guns and with breech-loading cannon by increasing the size and strength of parts, or without material change in construction or organization of devices.

My improvements will hereinafter fully be described, preparatory to a specific designation of what I claim.

Figure 37:
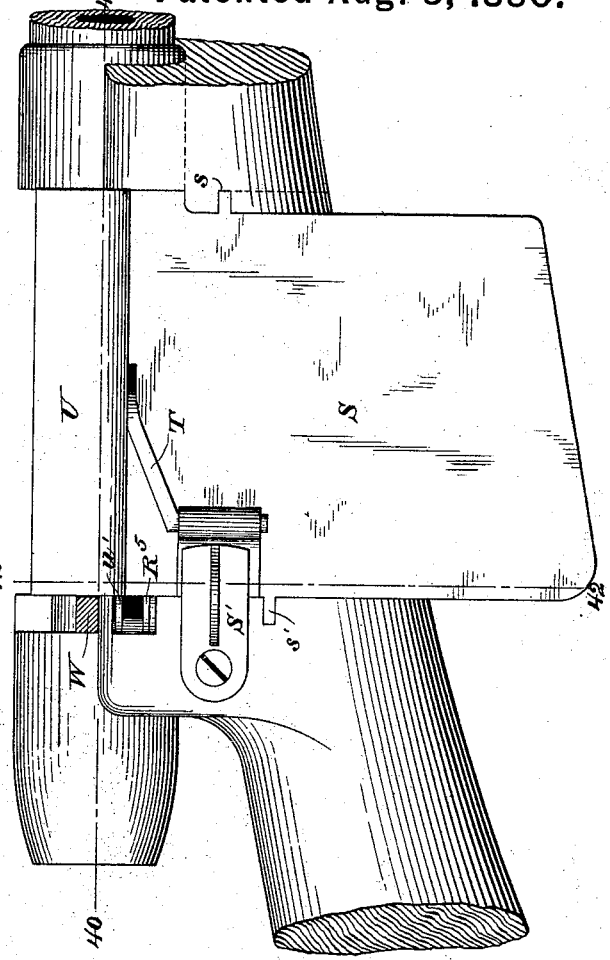
Figure 38:
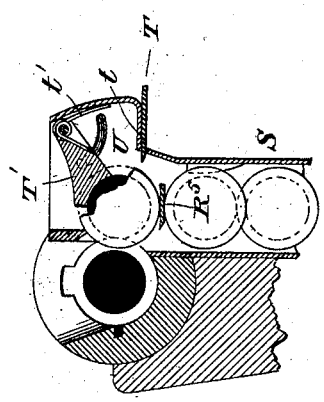
Figure 39:
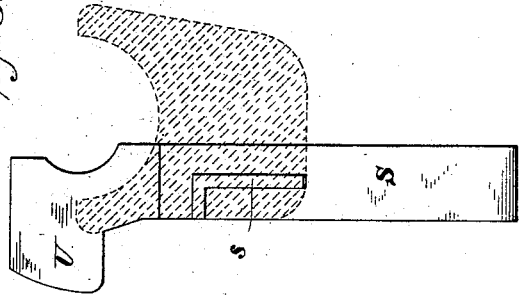

In the accompanying drawings, which show my improvements in the best form now known to me, as well as some modifications thereof, Figure 1 is a plan or top view of a portion of my improved gun with the breech-cylinder or housing for the breech-bolt partly broken away, and in section on the line 1 1 of Fig. 9, representing the breech-bolt and its attachments as thrust forward or adjusted and locked ready for firing; Fig. 2, a side elevation, with the parts in the same positions as in the preceding figure. Fig. 3 is a view, partly in plan and partly in longitudinal section, on the line 3 3 of Fig. 4, with the breech-bolt and its attachments in their retracted positions; Fig. 4, a view, partly in side elevation and partly in longitudinal vertical section, on the line 4 4 of Fig. 3. Fig. 5 is a longitudinal vertical section on the line 5 5 of Fig. 1. Fig. 6 is a horizontal longitudinal section through the bolt-housing or breech-cylinder, the receiver, and the firing-chamber or rear end of the barrel on the line 6 6 of Fig. 9. Figs. 7 and 8 respectively represent a horizontal longitudinal section, with parts in plan, and an under view of the breech-bolt and its attachments. Fig. 9 is a view, partly in vertical longitudinal central section and partly in elevation, as seen from the side opposite that represented in preceding figures, the breech-bolt being removed and parts broken away; Fig. 10, a transverse section through the magazine and receiver on the line 10 10 of Fig. 9; Fig. 11, a transverse section on the line 11 11 of Fig. 9. Figs. 12, 13, and 14 are vertical transverse sections on the lines 12, 13, and 14, respectively, of Fig. 9. Fig. 15 is a rear view of the breech-cylinder, the bolt, and cam and the lever thereof. Fig. 16 is a vertical section through the breech-cylinder on the line 16 16 of Fig. 9. Fig. 17 is a view, partly in plan and partly in section, showing the trigger-guard and portions of the magazine-chamber and its attachments. Figs. 18 and 19 are perspective views of the breech-bolt, locking-cam, and lever. Figs. 20, 21, and 22 are diagrams, with parts in section, showing the locking-cam in three positions. Fig. 23 is a view, in part perspective and in part sectional, of the breech-bolt, firing-pin, cam, &c. Fig. 24 is a side elevation of the gun complete, except that the barrel is partly broken away. Fig. 25 is a sectional view, showing an inclined arrangement of the magazine; Fig. 26, a similar view, the section being through the magazine and stock at a point in rear of the line of section in Fig. 25. Fig. 27 is a longitudinal section, with the trigger partly shown in side elevation, representing a modification in which the locking-cam is arranged horizontally or so as to work with the end projections or half-trunnions in side grooves in the bolt-housing instead of in top and bottom grooves, as before shown, the locking-lever being adapted to swing vertically, instead of horizontally, in locking the breech-bolt at the end of its forward movement. Fig. 28 is a view, partly in plan and partly in transverse longitudinal section, on the line 28 28 of Fig. 29, showing a modification of locking-cam and its operating devices, the cam being arranged horizontally or to work in side grooves, as described with reference to Fig. 27, and represented as in the locked position; Fig. 29, a side elevation of such modification; Fig. 30, a view of the same, partly in elevation and partly in section, on the line 30 30 of Fig. 31. Fig. 31, a view, partly in rear elevation and partly in section, on the line 31 31, of Fig. 29. Fig. 32 represents, in side elevation, another modification of the horizontally-arranged vertically-oscillating locking-cam and its operating devices, the parts being shown in the locked position; Fig. 33, a side elevation of the same, partly in section, on the line 33 33 of Fig. 35, the parts being shown as in the position occupied just after unlocking the bolt preparatory to retracting it, or as though the bolt had been moved forward ready to lock it by swinging the lever to turn the cam; Fig. 34, a section on the line 34 34 of Fig. 33; Fig. 35, a section on the line 35 35 of Fig. 32. Fig. 36 is a plan view designed to represent a modification of the magazine and its attachments; Fig. 37, a side elevation of the same; Fig. 38, a section on the lines 38 38 of Figs. 40 and 44; Fig. 39, a front elevation or edge view of such modified magazine, part of the stock of the gun being shown in dotted lines to partially represent the manner of securing the magazine in place; Fig. 40, a view, partly in plan and partly in horizontal longitudinal section, on the lines 40 40 of Figs. 37 and 41; Fig. 41, a view, partly in side elevation and partly in vertical longitudinal section, on the line 41 41 of Fig. 40; Fig. 42, a transverse vertical section on the lines 42 42 of Figs. 36 and 37; Fig. 43, a view, partly in rear elevation and partly in vertical transverse section, on the line 43 43 of Fig. 44; Fig. 44, a view, partly in plan and partly in horizontal longitudinal section, on the line 44 44 of Fig. 43; Fig. 45, a view, generally similar to that shown in Fig. 44, the positions of parts being altered; Fig. 46, a longitudinal or side elevation, partly in section, of the breech-bolt and immediate attachments thereof, selected for illustration in connection with the modifications represented by Figs. 36 to 44, both inclusive; Fig. 47, a view, partly in front elevation and partly in transverse section, through the shoe or bolt-housing and through the bolt on the line 47 47 of Fig. 46. Figs. 48 and 49 represent, partly in plan and partly in longitudinal horizontal section, such parts as are necessary to show a modification whereby the housing is considerably shortened and long guideways for the breech-bolt and lever dispensed with, the one view showing the bolt as retracted and the other illustrating the parts in the position assumed just after the swing of the lever to operate the cam and lock the bolt has commenced.

A suitable shoe, bolt-housing, or breech-cylinder, A, and a barrel, B, having a firing-chamber, $b$, are properly secured to a stock, A'. A shoe chamber or receiver, B', intermediate the firing-chamber and bolt-housing portion of the shoe, is provided.

Instead of employing endwise moving and turning breech-bolts or compound-motion breech-blocks, as heretofore commonly used, I have devised a system by which, practically considered, one motion only is imparted to the bolt or to a breech-block, and serves to actuate it while performing all necessary functions as well as in ordinary or two-motion systems.

By preference, a rectilinear to-and-fro or straight reciprocating motion is given to a breech-bolt, $A^2$, by the employment and organization of devices essentially as now to be described. (See Figs. 1 to 24, both inclusive.) A breech-bolt, $A^2$, the minor features or peculiarities of which, not always necessary, will in place be described, is provided near its heel end with a transverse vertical round opening or bearing, $a$, for a peculiar trunnion, pivot, or turning cam, C, which fits in its bearing in the bolt in such manner as to leave it free to be turned therein, yet prevent any other movement relatively thereto or independently of the bolt when the parts are in working position. This pivot C has cam-like end surfaces, C' C', each of nearly semicircular shape, or approximately half-cylindrical in form. One corner of each of these ends is slightly rounded off or cut away eccentrically, as at $a'$ $b'$. For convenience of description these pivot ends or cam half-trunnions will be termed "cam" trunnions simply. The cam-trunnions C' C' work in guideways or grooves $d$ $d$ in the top and bottom walls of the bore or channel in the bolt-housing, as the bolt is moved to and fro by a lever, D. This lever is rigidly united to the cam C, projects through a slot, E, in the side of the shoe or bolt-housing, and is provided with a diagonal rib or narrow projection, $e$, across its upper side, which works in a guideway or groove, $d'$, in the bolt-housing. This groove terminates at bottom in the slot E, and at their front ends the groove $d'$ and the slot E merge—that is to say, the slot is made of a height at $f$ equaling that of the heights of the main parts of the slot and of the groove combined.

The breech-bolt is also cut away at $e'$ on the side next the lever-handle, leaving the front and rear inclined shoulders, $f'$ $f^2$. (Best shown in Fig. 8.) A shoulder, $e^2$, on the bolt-housing limits the movement of the lever D forward.

A vertical opening, D', is made through the bolt-housing, and the guideways or cam-trunnion grooves $d$ $d$ terminate at this opening, which constitutes upper and lower corresponding cam-bearings, operating in connection with the cam-trunnions C' C'. The cam-opening D', through the top and bottom walls of the shoe or bolt-housing A, has corresponding shoulders $d^2$ $d^2$ in or about in the vertical plane of the longitudinal axis of the bolt.

By inspection of the drawings, with particular reference to the detailed views in Figs. 18, 19, 20, 21, and 22, it will be seen that when thrusting forward the bolt the operating-lever moves for the greater part of the travel in a straight line, its vibration or any turning movement of the cam being prevented by the guideways for the cam ends or trunnions and for the lever.

A little short of the completion of the advance movement of the bolt, and at the time the parts occupy the positions represented in Fig. 20, the guide-rib $e$ on the bolt-lever having reached the point $f$, where the guideways E and $d'$ merge, the lever is free to swing round somewhat, its rib being released from its guideway, and the cam becomes a rolling fulcrum, by which to thrust forward the bolt forcibly by the action of the eccentric corners or cut-away parts, $a'$ $b'$, of the cam-trunnions, which now first bear against the corner surfaces or shoulders $a^2$, at the rear walls of both the upper and lower parts of the bearing $D'$ in the bolt-housing, while the opposite segmental or uncut corners, $b^2$ $b^2$, of the cam-trunnions move away from the shoulders $d^2$-$d^2$, in line with the inner edges of the grooves $d$ $d$, and ride into depressions or inclines $b^3$ $b^3$ in the bearing $D'$.

By the time this final and forcible advance movement has been imparted to the bolt the corners $a'$ $b'$ of the cam-trunnions have moved away from the grooves $d$ $d$, and the cam occupies the position represented in Fig. 21, and a cartridge has been forced home or seated.

When the bolt-lever has been brought to the position shown by Fig. 22 the bolt is locked (see Figs. 1, 2, and 5) and the gun is ready for firing, as will fully be explained farther on. When unlocking and retracting the bolt, it will be understood that no motion is imparted to it by reversing the swing of the lever until at or about the time the positions represented by Fig. 21 are assumed, and from thence to the time the cam and lever have been caused to assume the positions shown in Fig. 20 the bolt is forcibly withdrawn a short distance by the action of the corners $b^2$ $b^2$ of the cam-trunnions upon the recessed parts or inclines $b^3$ $b^3$ of the bearing $D'$. A continued backward pull then withdraws the bolt to the starting position, (Shown in Figs. 3 and 4.)

It will be seen that in operating the bolt there is, practically considered, but one motion—a simple thrust or its equivalent—to advance and bring it to the locking position, and a reverse strain or pull to unlock and withdraw it, the slight horizontal swing of the lever being but a trifling divergence from and being in the horizontal plane of the rest of the motion, a movement which the hand readily accommodates and follows almost or quite imperceptibly to the user of the gun, and therefore without any inconvenience or special attention.

The locking-bolt $A^2$, it should be noticed, has no turning motion whatever, being simply reciprocated in a right line in its housing, and it is held securely by the cam when in the locked or firing position. This one-motion bolt system may advantageously be applied to many styles of breech-loading small arms, to cannon, and to machine-guns, and some modifications of the mechanism above described will hereinafter be explained.

To adapt the breech-bolt $A^2$ to guns to be charged with center-fire cartridges, the bolt is made tubular for near its entire length, having a bore of uniform diameter from its heel to its solid front end or head, $g$, centrally through which head a small opening is made for the passage of the striking end or point of a firing-pin, G. A light or weak coiled spring, $g'$, surrounding the pin, bears at front against the inside of the bolt-head $g$, and at rear against a guide-plug or elongated tapered shoulder, $G'$. (See Figs. 5, 7, 8, and 23.)

A shank or rearwardly-extending hook-ended arm, $G^2$, of the firing-pin fits in a slot, $g^2$, in the under side of the bolt. This slot extends forward from a point a little in advance of the cam C to a point slightly in rear of the forward end or reduced portion of the plug $G'$. The front wall or termination of the slot $g^2$ is sufficiently in advance of the enlarged or rear under-shouldered part of this plug to allow of proper play to the firing-pin, and acts as a stop to prevent too great advance movement of the firing-pin. This firing-pin is formed with or rigidly united to the plug and to the shank $G^2$, which extends backward from the shoulder or under side of the plug.

The slot $g^2$ may be, and preferably is, made for its entire length of the full width of the bore of the bolt. The front part at least of the slot must be of width sufficient to admit the plug.

The edges of the firing-pin shank work snugly in the slot or closely against its walls. A hook or catch, $g^3$, for engaging a stud or sear, $g^4$, on the trigger $G^3$, is shown as formed by cutting under or recessing the rear end wall of a groove, $G^4$, in the shank of the firing-pin. (See Figs. 5, 8, and 23.) This groove $G^4$ serves to allow the breech-bolt to be slid back and forth without interference from the sear in closing and locking and in unlocking and withdrawing the bolt.

A hooked shoulder or lug, $g^5$, at the front end of a groove, $g^7$, on the under side of the bolt-head, abuts against the front of the sear-stud and prevents accidental or too great retrograde movement of the bolt in retracting it. This stoppage of the bolt is prevented, when it is desired to withdraw the bolt and its attachments, by a pull on the trigger before the stop $g^5$ on the bolt comes against the sear. The breech-bolt may again be inserted in place without trouble by manipulating the trigger in an obvious way to prevent obstruction to the advance of the bolt, either by the sear or by a short stud or teat, $g^6$, on the trigger in rear of its pivot, and which enters a notch or recess, $a^3$, in the edge and under side of the lower annular part of the cam-pivot C when the gun is fired.

A single spring, H, acts on the trigger $G^3$, with a tendency at all times to keep it in the firing position or with the sear in the position it occupies when engaging the firing-pin hook $g^3$, as shown in Fig. 5.

An irregularly-curved groove or cam-incline, $a^4$, between the round or bolt-bearing parts $c$ $c$ of the cam acts upon a firing-pin actuating-spring, $h$, and its headed bolt or striker-pin $h'$.

A shallow cavity or slight recess, $a^5$, is preferably made in the cam-pivot, at or near the termination of the groove $a^4$, to receive the bolt-head when the spring is compressed. (See Figs. 5, 7, 18, 19, 21, 22, and 23.)

The front end of the spring $h$ bears against the base of the shoulder or plug G', and the rear end abuts against the base of the rounded head of the striker-bolt $h'$.

By referring to the already-explained construction and action of the breech-bolt, its cam, and the lever for actuating them, it will readily be understood that the following operation takes place when the gun is in use: Supposing the gun to be used as a single-loader or without a magazine, or when the cartridge is placed in the receiver by hand, should a magazine be attached but not used, and with the breech-bolt retracted, so that the stop $g^5$ thereon is close to or against the front side of the sear-stud, and at which time the spring $h$ is relaxed or inoperative while the spring $g'$ exerts sufficient force in a direction the opposite of that in which the stronger spring acts when compressed, to slightly retract the firing-pin and hold the head of the bolt $h'$ against the cam-pivot and in the deepest part of the groove $a^4$ thereof; now, upon moving forward the breech-bolt and turning the cam, the forcible advance movement of the bolt and cam during the swing of the lever will compress the spring $h$, while the sear engages the shank of the firing-pin, so that the pin cannot be moved forward independently of the breech-bolt. The spring, it will be seen, is gradually compressed by the cam-surface $a^4$ acting on the head of the pin, and as this spring is made strong and has but slight play, it is forced to contract between the plug G' and cam to a sufficient extent to give to it ample power, when released, to both overcome the slight force of the pin-retracting spring $g'$, and to shoot forward the firing-pin to explode the cartridge moved forward by the bolt and firmly seated in the firing-chamber. When the trigger is pulled the sear releases its hold on the firing-pin and the teat $g^6$ enters the recess in the cam, thus serving to prevent any possible accidental rearward movement of the breech-bolt by holding the cam against turning or unlocking at the moment of firing. This teat prevents the pulling of the trigger before the bolt is locked and after the compression of the firing-pin begins.

In retracting the breech-bolt the rear end of the firing-pin shank rides freely over the sear as the trigger vibrates on the pivot and the spring H yields, and the sear then bears first in the groove $G^4$ of the shank in advance of its hook, and next in the bolt-groove $g^7$, until the stop $g^5$ is reached.

It should be noticed that in manipulating the breech-bolt in advancing and locking it, as above described, the curved surface or incline $x$ thereof, in advance of the cam-pivot C, operates, in connection with the trigger and the firing-pin devices, in such manner that from and after the time at which the bolt in its advance comes to the point at which the sear $g$, engages the firing-pin hook $g^3$, the trigger is dogged first by the action of the incline $x$ on the teat $g^6$ and then by the cam-pivot acting upon the teat, so that until the bolt is pushed well home and fully locked the trigger cannot be pulled to release the firing-pin.

The incline $x$ is so proportioned and located as to begin to dog the teat and limit the motion of the trigger immediately after the hook $g^3$ is engaged by the sear, at and before which time the firing-pin is in its most forward position, with its compression-spring relaxed, and space is provided between the hook $g^3$ and the incline $x$ only sufficient to allow the teat to rise back of the hook and in front of the incline as the sear descends to pass under and engage the hook of the firing-pin. Directly after this, or as the sear rides up in front of the hook, the incline acts on the teat, dogging it until the cam-pivot comes into contact with and dogs it by the advance of the bolt.

It will thus be seen that for the greater part of the advance of the bolt, or until the lever D swings or is about to be swung, there is no control exercised over the trigger, as it is unnecessary to dog it until the firing-pin hook is reached and engaged by the sear. When the spring $h$ is to be partly compressed by the forward thrust of the bolt before swinging the lever, as hereinafter explained, the incline should, of course, extend somewhat farther forward.

An extractor, $H^2$, is fitted in a shallow groove in the top of the breech-bolt. This extractor is simple in its construction, and may readily be placed in position or removed from the bolt when detached from the gun. The shank of the extractor, as shown clearly in Figs. 5 and 23, is fitted in the groove at top of the bolt, so as to abut at the rear end against the cam-pivot and to overlap the cartridge-flange by its spring-hook $h^2$, as will readily be understood. An inclined spur or tooth, $h^3$, enters a seat or recess in the bottom of the bolt-groove, so that when the cam is in place in the bolt-bearing there can be no movement of the extractor independently of the bolt, except the proper yielding movement from the spur forward. When the breech-bolt is detached the extractor may be removed simply by dropping out the cam-pivot and then lifting and moving the extractor-shank backward slightly to disengage its incline-spur from its interlocking undercut or inclined seat. Obviously, instead of having the extractor-shank abut against the cam, it might be made shorter and be abutted against a detachable plug or screw countersunk at its head and fitted in the breech-bolt.

The cartridge, after being extracted or started during the forcible starting-motion of the bolt in its rearward movement, is expelled by contact of the under side of its flange with the rear end or abrupt shoulder of the recess $H^3$ in the bottom of the receiver in an obvious way.

It should be noticed that the bearing of the cam-trunnions, when the bolt is in the firing position, is on one side of the longitudinal axis of the bolt, and the recoil-strain or back thrust on the bolt in firing exerts a tendency to turn the cam in a direction the contrary of that in which it must be turned to unlock and withdraw the bolt or allow it to yield. The frictional contact between the rounded head of the pin $h$ and the cavity $a^5$ is also a guard against accidental movement of the cam and bolt from the locked position.

It is obvious that, instead of depending wholly upon the action of the incline $a^4$ upon the pin $h$ to compress the spring $h'$, the parts might be modified, so that a partial compression of the spring might take place before the lever is swung to turn the cam. This end would be accomplished by making the firing-pin shank somewhat shorter, or locating its hook a little farther forward, and causing the trigger-sear to come ahead of said hook sooner—that is, shortly before the action which turns the cam begins. In this way a spring of greater resilience may be employed, if desired.

The trigger-spring H is fastened at its front beneath the shoe chamber or receiver, works in a slot, I, in the stock, and bears at its free end against the trigger nose or arm H'.

The shoe or bolt-housing is slotted for the trigger to work in, and the trigger is pivoted at $i$ in this slot and works therein and in an inclined slot, I', down through the stock. (See Fig. 5.)

For military drill or practice, in operating the gun I adapt an adjustable dogging device or safety-stop to the bolt system, mainly intended for preventing the bolt being accidentally locked and the trigger set while yet permitting of the bolt-lever being given so nearly its full movement as to familiarize soldiers with the action of advancing, locking, unlocking, and retracting the breech-bolt. This safety-stop mechanism is also adapted to hold the breech-bolt and its attachments in what may be termed the "half-cock position," to prevent accidental firing; and, further, it serves to guard against accidental unlocking of the bolt when it is adjusted to the firing position.

By referring to Figs. 1, 2, 3, and 4 it will be seen that the construction and operation of suitable safety-stop devices are as follows: An arm, J, is jointed in a slot in the stock by a heel pin or pivot, $j$, and at its front is connected with one end of a thrust-spring, K, working freely in a curved slot in the stock and fastened at its lower end, $k$, by screws to the solid portion of the stock, as clearly shown in Fig. 4. The outer end of the stop-arm pivot $j$ bears in an angle-slot, $j'$, in a plate, K', fastened by screws to the stock and covering the slots in which the arm and spring are located. The pivot carries an arm or button, J', outside the covering-plate. The nose or forward end, $k'$, of the stop-arm is inclined from its point backward a short distance to an abrupt or vertical shoulder, and a little in rear of this shoulder-nose is a doubly-inclined shoulder or short curved projection, $k^2$, on the top edge of the stop-arm J. The distance between this curved projection and the shoulder of the nose $k'$ is about equal to or very slightly greater than the width of the bolt-lever D at that portion of it which rides on and over the stop-arm in operating the bolt and its cam. When the parts occupy the position in which they are shown in the drawings the bolt-lever, when thrust forward and partially swung round, is dogged by contact with the shoulder at the rear of the nose $k'$, and the turning of the bolt-cam to the firing position is positively stopped. When so checked in its movement the notch $a^3$ in the cam C is not in position to allow the trigger-stud $g^6$ to enter it, and consequently the gun cannot be fired. Moreover, the firing-pin spring has not at this time been fully compressed. The button J' may be pressed by the hand to allow the lever to swing over the shoulder $k'$ or the shoulder $k^2$, and upon releasing the button the stop-arm will return to its normal or operative position, provided its heel-pivot shall not have engaged the forwardly-projecting bottom part of the slot $j'$. If so engaged the pivot has to be released to restore the stop-arm to its working position.

When the gun is carried with the lever resting in the recess between the two shoulders the frictional contact between the lever and stop-arm, caused by the pressure of the spring K, will be sufficient to prevent accidental play of the lever, while a positive application of power will readily serve to move the lever over the rear or curved shoulder. The spring K acts both to throw up the nose of the stop-arm against its stop, and to draw forward the stop-arm and hold it locked out of the way when the button J' is pressed downward to bring the pivot $j$ in register with the lower part or laterally-projecting portion of the slot $j'$. When this pivot is locked in the base of the slot the stop-arm is inoperative, having been drawn sufficiently downward at its heel and forward and downward at its nose to leave the bolt-lever free to work without obstruction.

When the bolt is locked and the stop-arm in its operative position the pressure of the inclined nose of the arm against the lever acts with a tendency to prevent the accidental unlocking or back movement of the lever.

So far no reference has been made to the top notch or rearwardly-projecting short lateral slot at the upper end of the main part of the angle-slot $j'$, the description having been such as though this top notch were not employed. It is, however, preferable to provide it in all cases, for with it the above-explained operations and adjustments of the stop-arm are not necessarily interfered with, the normal position of the heel-pivot $j$ being below the top notch, as shown by the drawings, and a positive manipulation of the button J' being required to adjust the pivot in the top notch. When so adjusted the stop-arm is locked in its highest position, and serves to prevent the breech-bolt from being accidentally forced open in handling or carrying the gun. With the lever resting between the shoulders $k'$ and $k^2$ a firm and positive engagement is thus insured.

A forward and downward pressure of the button serves to quickly disengage the pivot of the stop-arm from the top notch and release the arm from the set or bolt-dogging position, to admit of the swinging of the lever and of the locking of the stop-arm in its lowest or inoperative position. A friction-swelling or slight fixed curved or inclined ridge, $y$, (see Figs. 1 and 2,) is, by preference, employed, over which the lever D may be readily forced or swung without difficulty or specially forcible effort, but with frictional contact great enough or resistance sufficient to offer some obstruction to its movement. Accidental or too free play of the lever is thus in some measure guarded against, which is especially desirable when the other before-described safety-stop devices are set in the inoperative position.

A magazine case or chamber, L, at the side of the stock delivers the cartridges, as required, upward and sidewise into the shoe chamber or receiver B', and at its bottom and on one side thereof. The opening into the receiver from the magazine-mouth is wholly to one side of the longitudinal center of the receiver, a small portion only of the bottom being cut away, thus not interfering with the bolt mechanism and its firing-pin and trigger-engaging devices. This magazine is preferably formed as best shown in Figs. 3, 4, 9, 10, 11, 12, 13, 14, and 17, the chamber or magazine proper L, trigger-guard L', and housing $L^2$ for springs, presently to be described, being formed together of metal or composed of rigidly and strongly connected metallic parts firmly fastened or screwed to the stock in advance and rear of the magazine-chamber, so as to strengthen the stock where it is cut away for the magazine.

The cartridges are placed in the magazine with their flanges lapping, the flange of one cartridge being in advance of that next below it, for an obvious purpose. The cartridges rest with their butts against the inclined rear wall of the magazine-chamber, and at front are guarded against shocks by a cushion (shown as formed by a spring, $l$) fastened at its lower end to the magazine-bottom. The main advantage in action of this spring over the before-known yielding end walls of magazines and the commonly-employed cartridge-feeding springs is not only that all the cartridges in the magazine are kept in proper position lengthwise thereof by the pressure upon them in front, but that they are in this way saved from the injurious effects of the shocks in firing the piece, at which time there is a tendency on the part of the cartridges to jump violently forward. When the cartridges are thus forced forward the spring yields, so acting as a cushion or graduating the shock and preventing the battering of the bullets, strain on the magazine, &c. The cartridges bear against the spring or a rubber or other cushion, as plainly shown in Figs. 3 and 4. The spring acts with a tendency to hold the cartridges in proper position relatively to each other and their chamber, and aids in delivering them to the receiver. This spring separates the cartridge-holding part or chamber of the magazine from the spring-housing portion $L^2$ thereof. In this housing is secured the spring $l^2$ of a cartridge raiser or pusher, $l'$. A shank, $l^3$, at the side of the holding-spring $l$, connects the raiser head or pusher $l'$ with the spring $l^2$. A stop, $l^4$, limits the upward movement of the pusher.

As shown in Figs. 1, 2, 3, and 4, the stock is uncut at $L^3$, where a rib is left to aid in securing and to strengthen the spring-housing part of the magazine attachment. Above this rib $L^3$ a spring, $L^4$, is secured at its rear end in the housing $L^2$, and carries a vertically playing or yielding guard or shut-off, $L^5$, for the magazine-chamber inlet or aperture through which the cartridges are supplied. Normally this shut-off gate or guard to the inlet of the magazine occupies its most elevated position, as shown in the drawings in Fig. 9 and elsewhere, and prevents the cartridges in the chamber from being forced out from the magazine at its side opposite that next the receiver, while offering no obstruction to the passage of cartridges from the magazine-mouth to the receiver.

In filling the chamber of the magazine the gate is forced downward as the cartridges are filled in, leaving ample space to insert cartridges between the top edge of the magazine-wall and a bridge or top part, M, and thus supply the magazine. When relieved of the downward pressure the gate ascends far enough to prevent egress of cartridges in any other way than sidewise from the magazine-mouth into the receiver B' beneath the bridge.

The bridge M is of peculiar formation on its under and inner surface, and is at one side of the longitudinal center of the barrel and breech-bolt housing. (See particularly Figs. 9, 10, 11, 12, 13, and 14, where is represented the manner of curving or recessing the bridge so as to admit cartridges to the receiver and guide and control their movements as supplied to the receiver from the magazine-mouth, and thence conducted to the firing-chamber by the thrust of the breech-bolt $A^2$.)

Supposing the breech-bolt to be retracted and about to be advanced, the operation of supplying and seating a cartridge from the magazine is as follows, reference being had to the last-referred-to figures and to Figs. 3, 4, and 6, ignoring for the present the hinged gate N: The topmost cartridge is elevated by the pusher against the bridge, so that its flange projects partially but very slightly into the path of travel of the breech-bolt head, (see dotted lines, Fig. 11,) and in which position it is prevented from accidental inward movement by a slight ridge or swell, $n$, (see Figs. 4 and 11,) at the rear portion of the edge or wall of the opening in the receiver-bottom, with which the magazine communicates, and by a similar ridge or downward swell, $n'$, on the bridge.

The point or nose of the cartridge is guided past the spring $l$ and into the firing-chamber $b$ by the flaring way or incline $m$ as the bolt advances.

Before the cartridge has been moved forward far enough by the advance of the bolt to jam or bind crosswise the flange will have been moved to a point where the two ridges $n \, n'$ begin to slope respectively downward and inward gradually to the plane of the bottom or lowest part of the receiver, and upward and inward, thus allowing the flange to pass toward its place in the receiver. The bridge is also cut away on a curve or incline, $m^2$, forward and inward from its lower edge to $m'$, so that as the front of the cartridge is entering the chamber the rear is being gradually brought into line therewith.

About the time the flange has been advanced to the point indicated by $m'$, Fig. 9, the curved recess or incline $m^2$ of the inner and under side of the bridge, which had previously served to gradually admit the inward passage of the flange, and which at this point terminates in a swell or ridge similar to $n'$, now serves to prevent its escape or outward movement and to direct it into the proper position to be pushed home and firmly seated by the bolt, as already described.

A swing gate or cover, N, for the magazine-chamber, serves to protect the cartridges, exclude dirt, &c. This gate is hinged upon the outside of the magazine-chamber by a pin, O, passing through spring or clamping lugs $o$ and bearings $o'$, or in other suitable way, so that sufficient frictional contact will be produced to prevent too easy movement of the gate. In this way the gate will normally stay in the position to which it may be adjusted.

The gate is shown as formed of sheet metal, which is bent so as to fit over the guard $L^5$ and in under the bridge M, and bear on the top cartridge. By bending the gate into the V shape, as shown, making its flap or turned-out edge $N'$ springy or slightly yielding, and providing a shoulder near the outer edge thereof, the gate may be closed and adjusted, as shown in Figs. 10 and 11, so as to be locked by abutting-contact of its shoulder with the bridge. Slight pressure will release the gate, so that it may be thrown back, as in dotted lines, Fig. 11, when the magazine is to be employed in firing.

With the gate closed passage of cartridges from the magazine to the receiver is prevented, and the gun may be used as an ordinary breech-loader supplied with cartridges by hand.

The swinging gate, when open, does not, it will be seen, interfere with the use of the gun as a magazine-loader, nor is the vibrating gate or shut-off interfered with. By opening the swinging gate part way it will serve as a shut-off or guard, answering a purpose similar to that of the guard $L^5$.

The bridge M is shown as formed with or attached to the magazine. It may, however, obviously, be formed with the shoe or breech of the gun partly over and at one side of the receiver-chamber.

Having now described, in connection with such parts of a gun as are deemed necessary to an understanding of my invention, the preferred constructions of parts and that particular organization of devices which I deem best for guns especially adapted for the military service, I will proceed to describe some of the modifications of my improvements or mechanical variations, all of which embody, more or less fully, essential elements or novel features of the improvements before described.

Figs. 25 and 26 represent a magazine and part of the gun-stock, the same essentially as already fully described, except that the magazine is inclined and the stock less bulky. Not only is such an arrangement more compact, but greater capacity is given the magazine.

Fig. 27 represents alterations in the particulars which, with brief description, will readily be understood by the aid of previous explanation. The cam C oscillates vertically or about a horizontal axis instead of a vertical one, and hence side guide-grooves are employed in the housing A, in place of the top and bottom grooves, $d \, d$, for the cam-trunnions. The operating-lever in this modification would, of course, swing vertically instead of horizontally, and be guided either by a top groove and work in a slot in the top and at one side of the center instead of at the side of the housing, or project from the side and be attached to one of the cam-trunnions.

To engage the cam with the trigger $G^3$ the teat $g^6$ of the latter operates in connection with a spring-supported stud, $p$, mounted in a recess in the breech-bolt. When the trigger is pulled its teat pushes upward the stud, causing it to engage with and dog the cam by entering the recess $p'$ in the side of the cam.

The general construction of parts and mode of operation are as before explained.

Figs. 28 to 31, inclusive, represent a way of working my bolt system by means of gearing. In this modification the horizontal arrangement of the cam is also shown, and it will here readily be understood how the side lever could be applied, in connection with the last-described modification, as a simple lever, such as before described, would be used in place of the stud P and segmental rack P', presently described, and such lever would project either upward or downward, according to choice.

The cam-trunnions work in the side ways or grooves $p^2 \, p^2$, and one of them projects out at the side and has the toothed arc or segmental rack P' and stop-arm or stud P attached to it. A suitably-guided bar or rack-shank, $P^2$, has teeth $P^3$ at its front end to engage the toothed arc. For small arms the rack-bar might be carried back to a spring-plate at the butt of the gun, so that pressure of the gun to the shoulder would operate the bolt to advance and lock it, while upon relieving the pressure the spring would act to unlock and retract the bolt.

I do not claim anything in this way of operating the breech-bolt by such spring-plate and pressure against the shoulder, as it is not of my invention.

The rack may be worked directly by hand or by a lever. The housing is cut away or recessed at $p^3$ at the front of the guideway $p^2$, through which the cam-trunnion projects, and the stud P, in moving from a horizontal to a vertical position, travels this recess, and finally abuts against or stops close to the shoulder $p$. This movement of the stud takes place when the forcible forward motion is being imparted to the bolt by turning the cam C and the final turning of the cam to lock the bolt.

The manner of imparting the oscillating movements to the cam by the rack-bar and segmental rack will readily be understood.

In Figs. 32 to 35, inclusive, is shown an arrangement differing from what has previously been described in the following respects: The operating-lever is either worked directly by hand or through a rod pivoted thereto, and a stud, $q$, on the lever is employed as the equivalent of the before-described rib $e$ or stud P. This stud $q$ works in the curved groove Q in oscillating the cam C.

By Figs. 36 to 47, inclusive, are shown modifications in the magazine and its connections, and in the manner of attaching it to the gun, as well as modifications in the ordinary two-motion breech-bolt to adapt it for use in connection with the other features.

I have here selected for illustration a bolt (which should be of tubular form, as readily understood) having the old reciprocating and turning motions, instead of a bolt such as that, $A^2$, before described, of my improved or one-motion system, for the purpose of showing the adaptability of my improvements in the magazine, &c., to the old as well as the new style of bolt.

In these modifications the breech-bolt $R^3$ has a straight narrow groove, $r^3$, extending from a shoulder, $r^4$, at the nose or front end of the bolt, backward for the greater portion of the length of the bolt, and terminating in a wider lateral groove, $R^4$. At the forward end of the groove $r^3$ it is deepened for a short distance, as at $r^5$.

It will readily be understood that the bolt $A^2$, hereinbefore first described, if provided at the side and near the bottom with the groove $r^3 r^5$, or equivalently constructed, would operate a separator, $R^5$, as presently more fully explained.

The bolt $R^3$, its connections, the manner of housing it, &c., resemble, except as hereinafter otherwise specified or particularly described, the generally similar bolts in common use—as, for instance, in the well-known Hotchkiss gun.

The magazine-chamber S, which, it should be understood, is principally intended and especially adapted for use, when desired, in lieu of the before-described magazines and in connection with the main or first described features of my improvements, is detachably secured to the gun by means of a front angle-rib, $s$, fitting into a corresponding slot in the gun-stock, a rear lug, $s'$, also fitting a slot for it, and a turning-button, $S'$, or equivalent adjustable holding device, which is moved into proper position after engaging the magazine with the slots in the stock.

A spring-follower or cartridge-elevator, $S^2$, is provided at the bottom of the magazine. The head of this follower is made quite long, as shown, so as to bear upon the cartridges for near their full length and properly present the cartridges successively, as they in turn come on top, to the action of a flange-separator or vibrating finger, $R^5$, and that of the bolt $R^3$.

A feed-stopper, T, formed by a bent plate or angle-rod having a broad head, $t$, working through a slot in the side of the magazine-chamber and pivoted at its heel to the side of the magazine near its rear end, bears, when swung into working position, upon the topmost cartridge and holds the series down against the action of the pusher-spring and out of the path of the breech-bolt.

A swinging cut-off gate and cartridge-director, T', at the mouth of the magazine, serves to guide the cartridges into the receiver and to prevent them from being ejected upward from the magazine. This gate has a limited vertical swing, as plainly indicated by the drawings, and readily yields and swings into the recess or enlargement U, when cartridges are being supplied to fill the magazine, by downward pressure.

A spring, $t'$, acts upon the pivot of this gate with a tendency to hold it swung upward or in its operative position.

The automatically-controlled vibrating finger or separator $R^5$ for the cartridge-flanges renders unnecessary any special arrangement of the cartridges, such as the lapping of their flanges to bring the flange of any given cartridge above the last in advance of the flange of that next below. This separator plays horizontally about its vertical heel-pivot $u$, mounted in bearing-lugs on the rear wall of the magazine. A short arm, $u'$, fixed to the sleeve of bearing-shank of the separator, is engaged and operated by the before-referred-to bolt-grooves $R^4 r^3 r^5$ and end shoulder, $r^4$, and the separator point or nose is caused to alternately project into a slot, $w$, in the rear of the magazine, swing between the flange of the upper cartridge and that of the one next below, and elevate the top cartridge at its base, so that in case of its flange having been behind that of the contiguous cartridge there will be no impediment to the proper movement of the upper cartridge into the receiver.

When the feed stop-arm is swung back it will readily be understood that the separator operates as follows, starting, say, at the time when the gun has just been fired and the bolt R³ unlocked and withdrawn: In swinging up the lever W from the firing position, during which time the separator occupied its inoperative position, the arm w' is undisturbed, as it is in the lateral slot R⁴, and during the greater part of the movement in sliding back the bolt the separator has no motion imparted to it, as its arm projects into the shallow groove r³. When, however, after the deepened end portion, r⁵, of the slot has been reached, and the nose r⁴ is brought against the separator-arm, the separator is vibrated and caused to assume its working position, as clearly shown in Fig. 44. When the bolt is again moved forward it engages the cartridge-flange while the separator is still in working position, and then trips the separator by contact with its arm of the rear shoulder of the deepened portion of the slot, after which time the separator-arm moves in the shallow or main part of the slot until the swing of the lever, at which time the arm is accommodated by the lateral groove, as before explained.

Figs. 48 and 49 represent a modification which may easily be explained so as readily to be understood by the aid of the description hereinbefore first given of my invention in connection with Figs. 1, 2, 3, &c. The housing A is shortened or cut off, the greater portion of the rear extension being dispensed with.

The lever D of the cam-pivot C is provided with a lug, Z, to operate, in connection with an inclined nose or hook, Z', on the free end of a spring attached at its heel to the end of the breech-bolt A². This spring-hook may be removably secured to the rear end of the bolt in any proper way. An abutment or stop formed by the rear of the housing, as at Z², acts upon the spring-shank of the nose or hook Z', so as to automatically release the lever at the time it is to be swung to lock the bolt by turning the cam-trunnioned pivot in its bearings in the housing.

In advancing the bolt the spring-hook holds the lever against vibration until the releasing-stop Z² is encountered; and after turning the cam by the swing of the lever, in unlocking, &c., the hook engages the stud Z, and the lever is thus locked with the bolt for retracting it.

I claim as, of my own invention—

1. The combination of the breech bolt or block, the cam-pivot fitted to oscillate therein and to have no endwise movement in its bearing in the bolt, and the shoe or housing having the bearings in which said cam-pivot works at its ends, when turned in locking and unlocking, substantially as and for the purpose hereinbefore set forth.

2. The combination, substantially as hereinbefore set forth, of the shoe or housing having cam-bearings, the reciprocating non-turning breech bolt or block, and the cam-trunnioned pivot reciprocating with said bolt or block, and turning in the shoe cam-bearings in forcibly completing the advance movement of the bolt or block, and locking it and in unlocking and starting it, as described.

3. The combination, substantially as hereinbefore set forth, of the shoe or housing having the cam-bearings, the pivot having the cam-trunnions reciprocating and guided in the shoe, the breech bolt or block in which said pivot is fitted, and means, essentially such as described, for operating and controlling the movements of said cam-trunnioned pivot in the manner and for the purpose described.

4. The combination, substantially as hereinbefore set forth, of the shoe or housing provided with the guideways for the cam-trunnions and lever, and having the cam-bearings, the reciprocating non-turning breech-bolt, the cam-trunnioned pivot, and the reciprocating swinging lever secured to said pivot.

5. The combination, substantially as hereinbefore set forth, of the shoe or housing provided with cam-bearings and having the lever-slot and guideway, the reciprocating non-turning breech-bolt, the cam-trunnioned pivot, mounted and turning in said bolt and working, during its direct reciprocations, in guideways, and turning in the cam-bearings in the shoe, and the lever provided with the projection by which it is guided in the shoe during the greater part of the movements imparted to it.

6. The combination, with the shoe or housing having the slot E, guideway d', and enlarged slot or opening f, and otherwise constructed, essentially as described, of the lever for operating the cam-trunnioned pivot, provided with the guiding projection working in the guideway d' in rear of the opening f, and allowing the lever to swing out at such opening, substantially as and for the purpose hereinbefore set forth.

7. The combination of the trigger and the cam-trunnioned pivot C, having the notch or recess to operate in connection with the trigger-teat, substantially in the manner and for the purpose hereinbefore set forth.

8. The combination of the reciprocating, non-turning tubular breech-bolt, the cam-trunnioned pivot fitted to turn therein, the trigger, and the firing-pin and its actuating-spring, operated upon by said pivot, substantially in the manner and for the purpose hereinbefore set forth.

9. The combination, with the actuating-lever or the specified equivalent thereof in the described one-motion system of operating breech-bolts, of the firing-pin and the cam-pivot C, having the groove or cam incline for compressing the firing-pin spring, substantially as hereinbefore set forth.

10. The combination of the cam-pivot C, having the cavity a⁵, and the firing-pin and its bolt, resting at its head in said cavity when the firing-pin spring is compressed, substantially as hereinbefore set forth.

11. The combination, substantially as hereinbefore set forth, of the shoe or housing, the reciprocating non-turning tubular breech-bolt, the cam-trunnioned pivot fitted in said bolt and working, when turned, in cam-bearings in the housing, the firing-pin, the trigger, its sear engaging with the firing-pin, the firing-pin compressing-spring, its bolt abutting against the cam-pivot and acted upon by the cam-groove or incline thereof, and the trigger-teat engaging the cam-pivot in firing.

12. The combination, substantially as hereinbefore set forth, of the reciprocating non-turning tubular breech-bolt having an incline, $x$, the hook-ended firing-pin shank, and the trigger provided with the sear to engage the firing-pin, and having the teat acted upon by the said incline, as described.

13. The combination, substantially as hereinbefore set forth, of the housing having the bearings for the cam-pivot, the reciprocating non-turning tubular breech-bolt, the cam-pivot fitted in said bolt and turning at its ends to lock and unlock in the housing-bearings, the operating-lever, the trigger provided with the teat in rear of its pivot and with the sear on its nose or arm, the trigger-spring, and the firing-pin.

14. The combination of the reciprocating non-turning tubular breech-bolt provided with the incline, the cam-pivot fitted to turn in said bolt in rear of its incline, the housing having bearings in which said cam-pivot works at its ends when turned to lock and unlock, the trigger provided with the sear and teat, and the grooved hook-ended firing-pin shank working in a slot in the breech-bolt, substantially as and for the purpose hereinbefore set forth.

15. The combination, substantially as hereinbefore set forth, of the shoe or housing, the reciprocating non-turning breech-bolt, the cam-trunnioned pivot, guided in its reciprocations in said housing and fitted to turn in said bolt and in cam-bearings in the housing in completing the advance and locking and in unlocking and starting the withdrawal of the bolt, the operating-lever and dogging devices or safety-stop mechanism, operating in connection with said lever, substantially as and for the purpose set forth.

16. The combination, substantially as hereinbefore set forth, of the vertically-yielding spring-supported heel-pivoted stop-arm, the vertically-shouldered nose or forward end thereof, the shoe or housing, the breech-bolt, the cam-trunnioned pivot, and the operating-lever dogged before its full forward swing by said shouldered nose, for the purpose described.

17. The combination of the stop-arm provided with the curved shoulder $k^2$, the heel-pivot of the arm, the spring supporting the arm at front, and the lever, substantially as and for the purpose hereinbefore set forth.

18. The combination, substantially as hereinbefore set forth, of the reciprocating breech-bolt, the lever, the stop-arm, its heel-pivot, the angle-slotted plate, and the button on said pivot.

19. The combination of the stop-arm provided with the nose $k'$ and doubly-inclined shoulder $k^2$, the spring K, the heel-pivot working in the angle-slot $j'$ in the plate, the button on said pivot outside the plate, and the lever, substantially as and for the purpose hereinbefore set forth.

20. The combination, substantially as hereinbefore set forth, of the shoe or housing provided with the cam-bearings, the reciprocating non-turning breech-bolt, the cam-trunnioned pivot, the lever, the shoe chamber or receiver, the magazine-chamber, and means, essentially such as described, for automatically supplying the cartridges and successively delivering them to the action of said bolt, whereby the cartridges are in turn directed to the firing-chamber and firmly seated therein in the manner described.

21. The combination, substantially as hereinbefore set forth, of the reciprocating, non-turning tubular breech-bolt, the cam-pivot fitted to oscillate therein, the lever, the shoe or housing having the bearings in which said cam-pivot works at its ends to lock and unlock, the shoe chamber or receiver, the firing-pin, the trigger engaging with the firing-pin, the magazine-chamber, opening at its mouth into the receiver and at the side thereof, and means, essentially such as described, for automatically supplying the cartridges and successively delivering them to the action of said bolt.

22. The combination of the shoe chamber or receiver, the bridge at the side and top of the receiver, and the magazine-chamber having an inlet to receive the cartridges inserted downward outside and beneath the bridge, and a mouth by which to conduct them beneath the bridge into and at the side of the receiver, substantially as hereinbefore set forth.

23. The combination, substantially as hereinbefore set forth, of the shoe chamber or receiver, the magazine-chamber, the bridge, and the yielding guard or shut-off gate to direct the cartridges beneath the bridge to the receiver, prevent their improper egress by way of the inlet beneath and at the side of the bridge, and yet admit of the ready filling of the magazine, as described.

24. The combination of the shoe chamber or receiver, the magazine-chamber, opening at its mouth sidewise into the receiver and having an inlet for the cartridges, and the hinged gate or cover for closing said mouth and inlet, or the inlet alone, substantially as and for the purpose set forth.

25. The combination of the shoe chamber or receiver, the magazine-chamber, having an inlet at top for the cartridges, and the spring acting against the fronts of the cartridges and yielding to relieve them from shocks in firing, while normally holding them against forward movement and assisting in guiding them as fed upward to the receiver, substantially as hereinbefore set forth.

26. The combination, substantially as hereinbefore set forth, of the magazine-chamber, the spring or cushion at the fronts of the cartridges to relieve them from shocks, and constantly bearing against them to prevent their accidental forward movement, and the pusher-spring or cartridge-raiser.

27. The combination of the magazine-chamber proper, its spring-housing, the yielding gate or shut-off carried by a spring mounted in said housing, the cartridge-pusher, also carried by a spring mounted in said housing, and the spring acting against the cartridge fronts and separating the spring-housing and cartridge-holding portions of the magazine, substantially as hereinbefore set forth.

28. The combination, substantially as hereinbefore set forth, of the reciprocating breech-bolt, the shoe chamber or receiver, the magazine-chamber having a mouth, as described, the cartridge-supplying mechanism, and the bridge M, having the ridge or swell $n'$, and otherwise curved or recessed, substantially in the manner and for the purpose set forth.

29. The bridge M, located relatively to the receiver and mouth of the magazine essentially as shown and described, and having the rear ridge, $n'$, and the curved or inclined surfaces $m'$ and $m^2$, substantially as and for the purpose hereinbefore set forth.

30. The combination of the tubular slotted breech-bolt, the firing-pin, formed with the guide plug or shoulder, and projecting at its point through the head of the breech-bolt, the weak spring surrounding the firing-pin at its front and bearing at its opposite ends upon the breech-bolt head, and the pin-plug, the shank of the firing-pin working in the breech-bolt slot, the bolt in rear of the firing-pin plug, and the actuating-spring, these members being and operating substantially as hereinbefore set forth.

31. The combination of the shoe chamber or receiver, the breech-bolt, the magazine-chamber, the cartridge pusher, spring, or raiser, and the vibrating separator actuated by the reciprocations of the breech-bolt and working through the rear wall of the magazine between the flanges of the cartridges, said separator being caused to raise the butt-end of the topmost cartridge and lift its flange from that of the cartridge next below it when the bolt is withdrawn, hold it up until the bolt has been partially advanced, and then swing out to allow the cartridge-raiser to act, substantially as hereinbefore set forth.

32. The combination, substantially as hereinbefore set forth, with a magazine-chamber, of the vibrating separator working through a slot in the magazine-chamber and having the heel-pivot and short arm, and the breech-bolt having a groove, $r^3$, deepened at $r^5$, and serving to operate the separator in the manner described.

In testimony whereof I have hereunto subscribed my name.

ANDREW H. RUSSELL.

Witnesses:
CHARLES W. SEVER,
ALLEN DANFORTH.